(12) United States Patent
Kim et al.

(10) Patent No.: US 10,909,693 B2
(45) Date of Patent: Feb. 2, 2021

(54) IMAGE ANALYSIS METHOD, DEVICE, SYSTEM, AND PROGRAM, WHICH USE VEHICLE DRIVING INFORMATION, AND STORAGE MEDIUM

(71) Applicant: LG INNOTEK CO., LTD., Seoul (KR)

(72) Inventors: Dong Gyun Kim, Seoul (KR); Seung Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/463,315

(22) PCT Filed: Nov. 23, 2017

(86) PCT No.: PCT/KR2017/013443
§ 371 (c)(1),
(2) Date: May 22, 2019

(87) PCT Pub. No.: WO2018/097627
PCT Pub. Date: May 31, 2018

(65) Prior Publication Data
US 2019/0279374 A1 Sep. 12, 2019

(30) Foreign Application Priority Data

Nov. 23, 2016 (KR) .................. 10-2016-0156668

(51) Int. Cl.
*G06T 7/246* (2017.01)
*G06T 7/80* (2017.01)
(Continued)

(52) U.S. Cl.
CPC .............. *G06T 7/248* (2017.01); *B60W 40/02* (2013.01); *B60W 40/105* (2013.01); *G06K 9/00* (2013.01);
(Continued)

(58) Field of Classification Search
CPC .. G06T 7/248; G06T 7/80; G06T 7/97; G06T 2207/30252; B60W 40/105; B60W 2520/10; B60W 2540/18
(Continued)

(56) References Cited

U.S. PATENT DOCUMENTS

2003/0210807 A1* 11/2003 Sato .................. G06K 9/00805
382/104
2006/0140447 A1* 6/2006 Park .................... G06K 9/3241
382/104
(Continued)

FOREIGN PATENT DOCUMENTS

KR 10-2006-0075311 A 7/2006
KR 10-2012-0025718 A 3/2012
(Continued)

*Primary Examiner* — Christopher S Kelley
*Assistant Examiner* — Asmamaw G Tarko
(74) *Attorney, Agent, or Firm* — Birch, Stewart, Kolasch & Birch, LLP

(57) ABSTRACT

The present invention relates to an image analysis method, device, system, and program, which use vehicle driving information, and a recording medium, and according to one embodiment of the present invention, an image analysis method of a device linked with a camera and a controller through an in-vehicle communication network can comprise the steps of: receiving vehicle driving information from at least one controller for controlling vehicle driving; receiving image information captured by the camera; generating a first optical flow pattern estimated on the basis of the vehicle driving information; generating a second optical flow pattern calculated on the basis of the image information; and identifying a foreground movement pattern on the basis of the first optical flow pattern and the second optical flow pattern. Therefore, the present invention can more accurately analyze, by using vehicle driving information, an image captured by a camera.

11 Claims, 15 Drawing Sheets

(51) Int. Cl.

| | |
|---|---|
| *G06T 7/00* | (2017.01) |
| *B60W 40/105* | (2012.01) |
| *G06K 9/00* | (2006.01) |
| *G06T 7/254* | (2017.01) |
| *B60W 40/02* | (2006.01) |
| *G06T 7/20* | (2017.01) |
| *H04N 5/225* | (2006.01) |
| *G06K 9/48* | (2006.01) |
| *G06T 7/269* | (2017.01) |

(52) U.S. Cl.
CPC ............... *G06K 9/48* (2013.01); *G06T 7/20* (2013.01); *G06T 7/254* (2017.01); *G06T 7/269* (2017.01); *G06T 7/80* (2017.01); *G06T 7/97* (2017.01); *H04N 5/225* (2013.01); *B60W 2520/10* (2013.01); *B60W 2540/18* (2013.01); *G06T 2207/30252* (2013.01)

(58) Field of Classification Search
USPC ........................................................ 348/148
See application file for complete search history.

(56) References Cited

U.S. PATENT DOCUMENTS

| | | | |
|---|---|---|---|
| 2012/0249399 A1* | 10/2012 | Sato | G06T 7/13 345/4 |
| 2014/0253785 A1* | 9/2014 | Chan | H04N 5/232 348/349 |
| 2015/0086080 A1* | 3/2015 | Stein | H04N 7/183 382/104 |
| 2015/0169958 A1* | 6/2015 | Lee | G06K 9/00771 382/103 |
| 2015/0199810 A1* | 7/2015 | Lee | G06K 9/00771 382/103 |
| 2018/0098014 A1* | 4/2018 | Zuleta | H04N 5/378 |
| 2019/0026572 A1* | 1/2019 | Theodosis | G06K 9/00812 |

FOREIGN PATENT DOCUMENTS

| | | |
|---|---|---|
| KR | 10-2015-0005388 A | 1/2015 |
| KR | 10-2015-0077654 A | 7/2015 |

\* cited by examiner

IMAGE ANALYSIS METHOD, DEVICE, SYSTEM, AND PROGRAM, WHICH USE VEHICLE DRIVING INFORMATION, AND STORAGE MEDIUM

CROSS REFERENCE TO RELATED APPLICATIONS

This application is the National Phase of PCT International Application No. PCT/KR2017/013443, filed on Nov. 23, 2017, which claims priority under 35 U.S.C. 119(a) to Patent Application No. 10-2016-0156668, filed in the Republic of Korea on Nov. 23, 2016, all of which are hereby expressly incorporated by reference into the present application.

TECHNICAL FIELD

Embodiments relate to image analysis, and more particularly to an image analysis method, device, system, and program that are capable of analyzing a motion pattern using an optical flow pattern estimated based on vehicle driving information while a vehicle is driven and an optical flow pattern calculated based on image information captured by a camera, and a recording medium.

BACKGROUND ART

Vehicles, such as automobiles, are required to provide a function of various convenient means for enabling users to more stably and comfortably drive the vehicles in addition to a function of a transport means.

In recent years, various driver assistance systems for safe driving have come to be mounted in vehicles.

A dangerous situation caused not only by careless driving of an ego-vehicle driver but also by careless driving of other vehicle drivers may occur on a road, on which vehicles are driven, whereby a large-scale accident may occur.

Conventionally, an advanced driver assistance system capable of sensing an object in front of a car using a camera and a lidar while the vehicle is being driven and issuing an audio or video warning such that a driver brakes the vehicle or reduces the speed of the vehicle in the case in which there is the possibility of a collision, such as a pre-collision system, is mounted in vehicles. However, the lidar is expensive equipment, and is thus optionally mounted only in luxury vehicles.

In addition, at present, a complementary metal-oxide-semiconductor (CMOS) camera is used in some vehicles in order to identify an object in front of the vehicle. However, it is not possible to acquire sufficiently reliable information to perform automatic urgent braking using only the CMOS camera.

In a conventional object sensing method using a camera, as shown in FIG. 1, an image capture unit, i.e. a camera, receives an image captured by an image sensor provided therein, and transmits the captured image to an optical flow vector calculation unit. The optical flow vector calculation unit extracts feature points from the received image and matches the extracted feature points in order to calculate an optical flow vector.

A motion assortment unit identifies a foreground motion and a background motion based on the calculated optical flow vector.

That is, conventionally, a moving object in front of a vehicle is identified using only image information captured by the camera. However, the optical flow assortment method using only the image information captured by the camera has problems in that an error occurrence probability is high at the time of calculating the optical flow vector and in that the accuracy of the camera is drastically reduced depending on the physical disposition state of the camera.

In addition, an image analysis method using only a camera has problems in that a large number of operations is required in order to distinguish between optical flow vectors based on the motion of a vehicle and in that it is not possible to accurately identify motion due to processing delay and operation errors caused by the operations.

Therefore, there is urgent necessity for an image analysis device capable of more accurately identifying a moving object in front of a vehicle through more accurate image analysis.

DISCLOSURE

Technical Problem

The present disclosure has been made in view of the above problems, and embodiments provide an image analysis method and an image analysis device using vehicle driving information, an image analysis system using the same, a program for realizing the image analysis method, and a recording medium having the program recorded therein.

Embodiments provide an image analysis method and device capable of analyzing a motion pattern using an optical flow pattern estimated based on vehicle motion information and an optical flow pattern calculated based on image information captured by a camera.

Embodiments provide an image analysis method and device capable of comparing an optical flow pattern estimated based on vehicle motion information with an optical flow pattern calculated based on image information captured by a camera to identify a foreground motion and a background motion and automatically correcting the camera based on the identified background motion.

The technical objects that can be achieved through the embodiments are not limited to what has been particularly described hereinabove, and other technical objects not described herein will be more clearly understood by persons skilled in the art from the following detailed description.

Technical Solution

Embodiments provide an image analysis method and device using vehicle driving information and an image analysis system including the image analysis device.

In one embodiment, an image analysis method, in a device operatively connected to a camera and a controller through an in-vehicle communication network, includes receiving vehicle driving information from at least one controller for controlling the driving of a vehicle, receiving image information captured by the camera, generating a first optical flow pattern estimated based on the vehicle driving information, generating a second optical flow pattern calculated based on the image information, and identifying a foreground motion pattern based on the first optical flow pattern and the second optical flow pattern.

Here, the vehicle driving information may include steering angle information and vehicle speed information, and the step of generating the first optical flow pattern may include estimating the direction of an optical flow vector based on the steering angle information, estimating the magnitude of the optical flow vector based on the vehicle speed information, estimating the optical flow vector based on the estimated direction and magnitude, and mapping the estimated optical flow vector in a predetermined image plane in order to generate the first optical flow pattern.

In addition, the image plane may be set based on predetermined setting parameters of the camera.

Here, the setting parameters may include at least one of the orientation angle of the camera or the direction in which the camera is disposed.

In addition, the step of generating the second optical flow pattern may include extracting image frames from the image information, calculating an optical flow vector using two successive ones of the image frames, and mapping the calculated optical flow vector in a predetermined image plane in order to generate the second optical flow pattern.

In addition, the image plane may be set based on one of the image information and the predetermined setting parameters of the camera.

In addition, the motion pattern may be identified based on the difference value between the optical flow vectors of the first optical flow pattern and the second optical flow pattern at corresponding positions thereof.

In the case in which the difference value is within a predetermined reference range, the optical flow vectors may be confirmed or sorted as a background motion pattern.

In the case in which the difference value deviates from the reference range, the optical flow vectors may be confirmed or sorted as the foreground motion pattern.

In addition, the background motion pattern and the foreground motion pattern may be generated based on the results of confirming the motion pattern.

Here, the setting parameters of the camera may be corrected based on the background motion pattern.

In addition, a moving object may be identified based on the foreground motion pattern.

In another embodiment, an image analysis device, operatively connected to a camera and a controller through an in-vehicle communication network, includes a communication unit for receiving vehicle driving information and image information through the in-vehicle communication network, an optical flow pattern generation unit for generating a first optical flow pattern estimated based on the vehicle driving information and a second optical flow pattern calculated based on the image information, and a motion pattern identification unit for identifying a motion pattern based on the first optical flow pattern and the second optical flow pattern, wherein the motion pattern includes a foreground motion pattern and a background motion pattern.

Here, the vehicle driving information may be received from at least one controller for controlling the driving of a vehicle, and may include steering angle information and vehicle speed information, and the optical flow pattern generation unit may include a first optical flow pattern generation unit, which includes an optical flow direction estimation unit for estimating the direction of an optical flow vector based on the steering angle information, an optical flow magnitude estimation unit for estimating the magnitude of the optical flow vector based on the vehicle speed information, an optical flow vector estimation unit for estimating the optical flow vector based on the estimated direction and magnitude, and a first image plane mapping unit for mapping the estimated optical flow vector in a predetermined image plane to generate the first optical flow pattern.

Here, the image plane may be set based on predetermined setting parameters of the camera.

In addition, the setting parameters may include at least one of the orientation angle of the camera or the direction in which the camera is disposed.

In addition, the optical flow pattern generation unit may include a second optical flow pattern generation unit, which includes an image frame extraction unit for extracting image frames from the image information, an optical flow vector calculation unit for calculating an optical flow vector using two successive ones of the image frames, and a second image plane matching unit for mapping the calculated optical flow vector in a predetermined image plane to generate the second optical flow pattern.

Here, the image plane may be set based on one of the image information and the predetermined setting parameters of the camera.

In addition, the motion pattern identification unit may include an optical flow pattern comparison unit for comparing the optical flow vectors of the first optical flow pattern and the second optical flow pattern with each other at corresponding positions thereof, a background motion confirmation unit for confirming the optical flow vectors as the background motion pattern in the case in which the difference value between the optical flow vectors is within a predetermined reference range, and a foreground motion confirmation unit for confirming the optical flow vectors as the foreground motion pattern in the case in which the difference value deviates from the reference range In addition, the motion pattern identification unit may generate the background motion pattern and the foreground motion pattern based on the identification result, and the image analysis device may further include at least one of a camera correction unit for correcting the setting parameters of the camera based on the background motion pattern or an object detection unit for detecting a moving object based on the foreground image pattern.

In another embodiment, an image analysis system includes an image capture device for collecting image information of a vehicle that is being driven using at least one image sensor included therein and an image analysis device, which includes a communication unit for receiving vehicle driving information and the image information through an in-vehicle communication network, an optical flow pattern generation unit for generating a first optical flow pattern estimated based on the vehicle driving information and a second optical flow pattern calculated based on the image information, and a motion pattern identification unit for identifying a motion pattern based on the first optical flow pattern and the second optical flow pattern, wherein the motion pattern includes a foreground motion pattern and a background motion pattern.

In another embodiment, a vehicle having an in-vehicle communication network includes an image capture device for collecting image information of a vehicle that is being driven using at least one image sensor included therein, at least one controller for collecting vehicle driving information, and a motion pattern identification unit for generating a first optical flow pattern estimated based on the vehicle driving information and a second optical flow pattern calculated based on the image information and identifying a motion pattern based on the first optical flow pattern and the second optical flow pattern upon receiving the vehicle driving information and the image information through the in-vehicle communication network.

In another embodiment, an image analysis device for vehicles includes at least one processor and at least one memory for storing a program executed by the at least one processor, wherein the at least one processor receives vehicle driving information and image information through an in-vehicle communication network, generates a first optical flow pattern estimated based on the vehicle driving information, generates a second optical flow pattern calculated based on the image information, and identifies a motion pattern based on the first optical flow pattern and the second optical flow pattern to generate a foreground motion pattern and a background motion pattern.

In a further embodiment, there are provided a program for realizing the image analysis method and a computer-readable recording medium having the program recorded therein.

The above aspects of the disclosure are merely some of the preferred embodiments, and various embodiments in which the technical features are incorporated may be derived and understood by those skilled in the art from the detailed description which follows.

Advantageous Effects

A method and device according to embodiments have the following effects.

It is possible to provide an image analysis method and an image analysis device using vehicle driving information, and an image analysis system using the same.

In addition, it is possible to provide an image analysis method and device capable of identifying a motion pattern using an optical flow pattern estimated based on vehicle motion information and an optical flow pattern calculated based on image information captured by a camera, thereby more accurately identifying a moving object in front of a vehicle.

In addition, it is possible to provide an image analysis method and device capable of comparing an optical flow pattern estimated based on vehicle motion information with an optical flow pattern calculated based on image information captured by a camera to identify a foreground motion and a background motion and automatically correcting the camera based on the identified background motion.

It will be appreciated by those skilled in the art that that effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and, together with the description, serve to explain the principles of the disclosure. It is to be understood, however, that the technical features of the present disclosure are not limited to the specific drawings, and the features disclosed in the drawings may be combined to constitute a new embodiment. In the drawings.

BEST MODE

Figure 1:
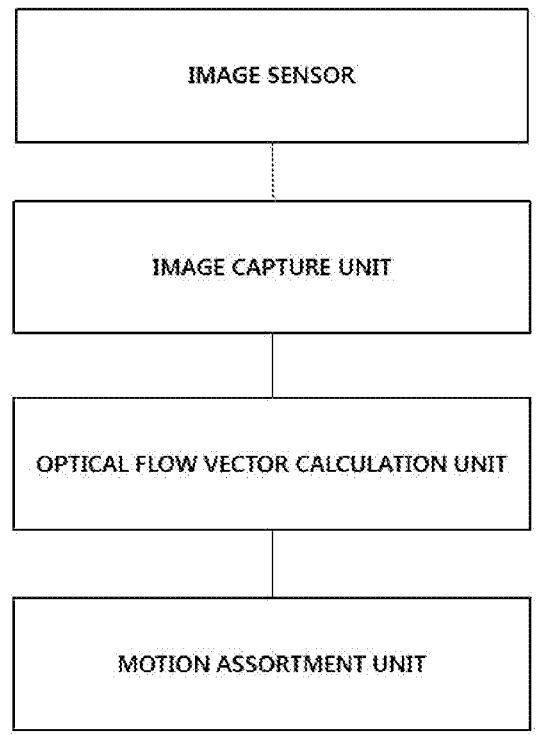
FIG. 1 is a view illustrating the construction of a conventional device for analyzing an image using a camera mounted in a vehicle.

An image analysis method, in a device operatively connected to a camera and a controller through an in-vehicle communication network, according to an embodiment may include receiving vehicle driving information from at least one controller for controlling the driving of a vehicle, receiving image information captured by the camera, generating a first optical flow pattern estimated based on the vehicle driving information, generating a second optical flow pattern calculated based on the image information, and identifying a foreground motion pattern based on the first optical flow pattern and the second optical flow pattern.

MODE FOR INVENTION

Hereinafter, a device and various methods to which embodiments are applied will be described in detail with reference to the drawings. As used herein, the suffixes "module" and "unit" are added or used interchangeably to facilitate preparation of this specification and are not intended to suggest distinct meanings or functions.

While all elements constituting embodiments of the present disclosure are described as being connected into one body or operating in connection with each other, the disclosure is not limited to the described embodiments. That is, within the scope of the present disclosure, one or more of the elements may be selectively connected to operate. In addition, although all elements can be implemented as one independent hardware device, some or all of the elements may be selectively combined to implement a computer program having a program module for executing some or all of the functions combined in one or more hardware devices. Code and code segments that constitute the computer program can be easily inferred by those skilled in the art. The computer program may be stored in a computer-readable storage medium, which is read and executed by a computer to implement an embodiment of the present disclosure. The storage medium of the computer program may include a magnetic recording medium and an optical recording medium.

The terms "include," "comprise" and "have" should be understood as not precluding the possibility of existence or addition of one or more other components unless otherwise stated. All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

In describing the components of the present disclosure, terms such as "first," "second," "A," "B," "(a)," and "(b)" may be used. These terms are used only for the purpose of distinguishing one constituent from another, and the terms do not limit the nature, order or sequence of the components. When one component is said to be "connected," "coupled" or "linked" to another, it should be understood that this means that the one component may be directly connected or linked to the other one, or that yet another component may be interposed between the components.

Figure 2:
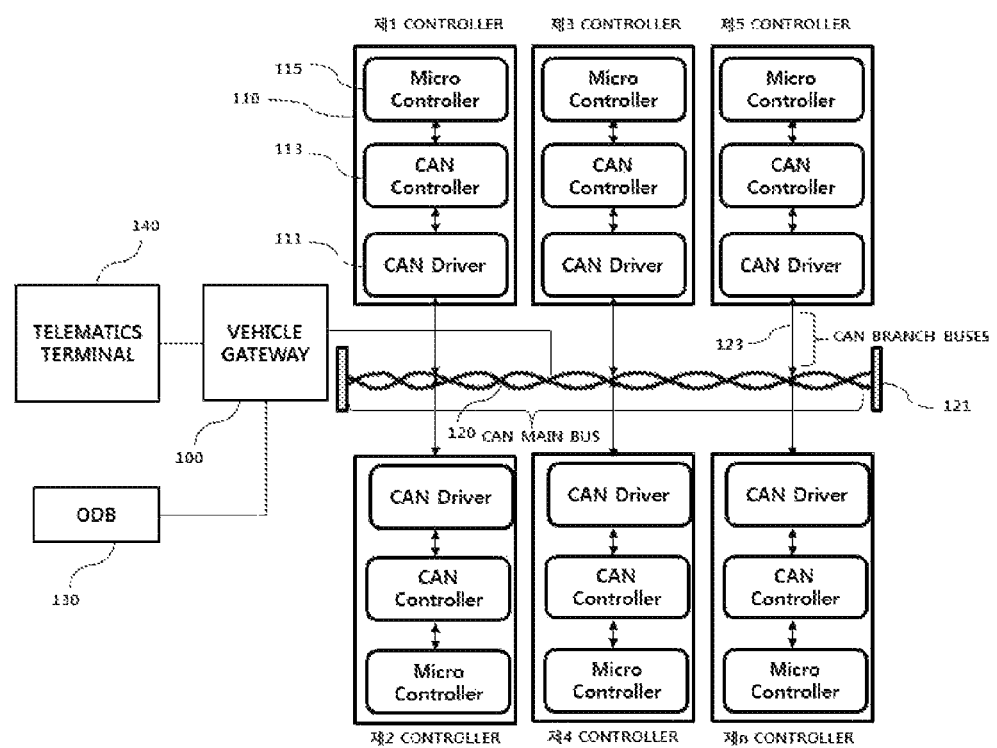
FIG. 2 is a schematic block diagram of a vehicle communication network according to an embodiment.

FIG. 2 is a schematic block diagram of a vehicle communication network according to an embodiment.

Referring to FIG. 2, a high-speed CAN network according to an embodiment may mainly include at least one of a vehicle gateway 100, first to nth controllers, a CAN bus 120, an ODB 130, or a telematics terminal 140.

The vehicle gateway 100 may determine whether controllers connected over the CAN network are safe controllers through a procedure for authenticating the controllers. In addition, the vehicle gateway 100 may be connected to the telematics terminal 14 and the ODB 130 in a wired or wireless fashion.

In particular, the vehicle gateway 100 may collect version information of software installed in controllers mounted in a vehicle, i.e. ECUs, in response to a predetermined control signal from the telematics terminal 14 or the ODB 130, and may transmit the information to the telematics terminal 14 or the ODB 130. In addition, upon receiving a software update request from the telematics terminal 14 or the ODB 130, the vehicle gateway 100 may receive software files for controllers from the telematics terminal 14 or the ODB 130, and may install the software in the controllers.

Twisted-pair wires are used as the CAN main bus 120, and the two wires are driven according to different signals CAN_HI and CAN_LO. Termination resistors 121 may be provided at opposite ends of the CAN main bus. The transmission speed in the CAN main bus 120 may be changed depending on the length of the bus, i.e. the length of the main wire.

The first to nth controllers may be connected to a predetermined CAN joint connector or a CAN hub (not shown) via CAN branch buses 123. Theoretically, the maximum number of controllers capable of being connected to a single CAN network is 2032. In addition, a plurality of controllers may be connected to a single CAN hub via the CAN branch buses 123.

Hereinafter, the structure of the controllers that are connected to a general CAN network will be described with reference to reference numerals 110 to 115.

The first controller 110 may include a CAN driver 111, a CAN controller 113, and a microcontroller 115.

The CAN driver 111 is connected to the CAN bus 120 via a predetermined CAN connector or CAN hub, and constitutes a physical layer of the controller. The CAN driver 111 may provide a function of sensing and managing obstruction of the CAN bus 120 and a function of transmitting and receiving a message.

The CAN controller 113 transmits and receives a CAN protocol message and filters the received message. Alternatively, the CAN controller 113 provides a function as a message buffer for retransmission control and a function as an interface with the microcontroller 115.

A CPU may be mounted in the microcontroller 115, which may provide an upper-layer protocol and various applications.

Although not shown in FIG. 2, the controller may include a predetermined memory having priority information, installed software version information, and sensing information recorded therein.

Here, the memory may include at least one of flash memory type memory, hard disk type memory, multimedia card micro type memory, card type memory (e.g. SD or XD memory), random access memory (RAM), Static Random Access Memory (SRAM), read-only memory (ROM), electrically erasable programmable read-only memory (EEPROM), programmable read-only memory (PROM), magnetic memory, a magnetic disk, or an optical disk.

Figure 3:
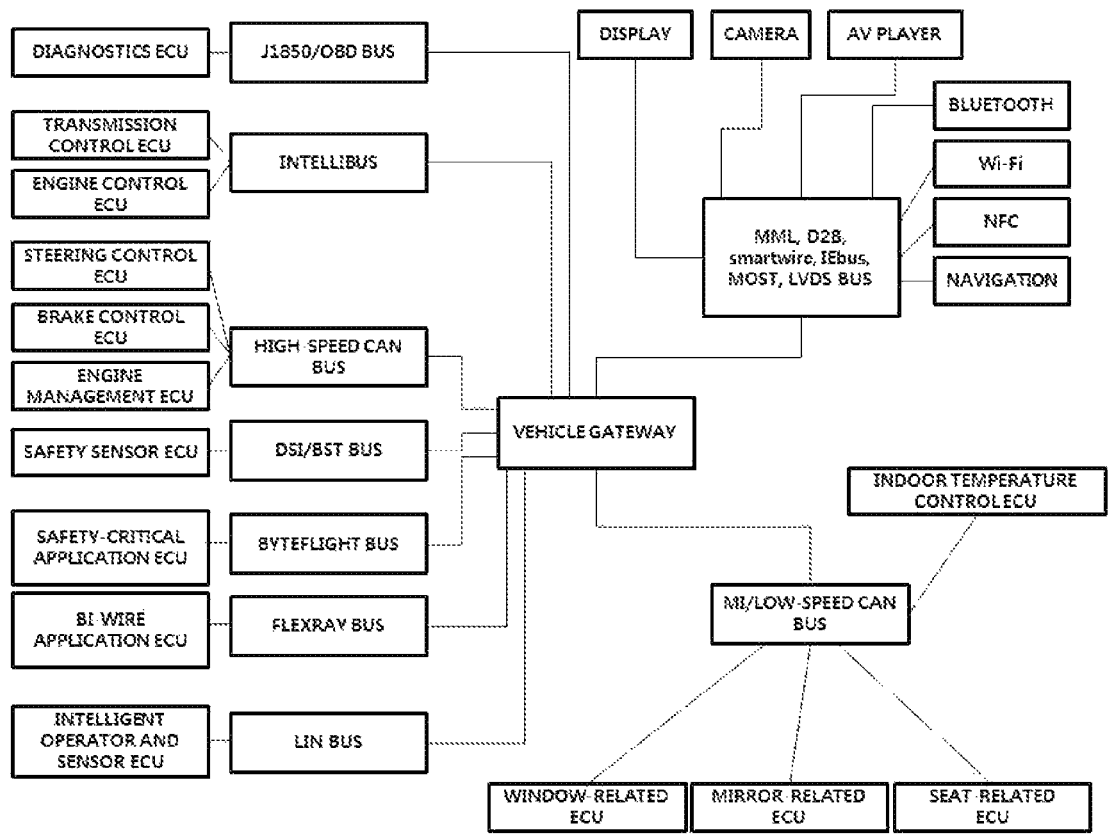
FIG. 3 is a view illustrating the structure of an in-vehicle communication network according to another embodiment.

FIG. 3 is a schematic block diagram of a vehicle communication network to which an embodiment is applied.

As shown in FIG. 3, the vehicle communication network may provide protocol conversion between electronic control units (hereinafter, simply referred to as ECUs) for supporting different bus communication protocols in a single vehicle gateway such that communication is possible therebetween.

Hereinafter, bus communication protocols capable of being connected to the vehicle gateway and ECUs using the bus communication protocols will be described briefly.

In an example, the vehicle bus communication protocols may include:

(1) a J1850 and/or OBDII bus that is generally used for vehicle diagnostics and electric elements;

(2) Intellibus that is generally used for vehicle systems, such as engine control, transmission control, and indoor temperature control (climate control) and that may be used for drive-by-wire and an electronic control unit (ECU);

(3) a high-speed measurement controller communication network (high-speed CAN bus) that is generally used for steering control systems, braking systems, and engine management systems;

(4) a distributed system interface (DSI) and/or Bosch-Siemens-Temic (BST) bus that is generally used for safety-related electric equipment;

(5) ByteFlight that is generally used for electric equipment applications important for safety;

(6) a local interconnect network (LIN) that is generally used for intelligent operators and/or intelligent sensors;

(7) a low-speed measurement controller communication network (CAN) and/or Motorola® interconnect (MI) that is generally used for windows, mirrors, seats, and/or low-speed electric equipment, such as an indoor temperature controller;

(8) a mobile media link (MML), domestic digital data (D2B), smartwireX, inter-equipment bus (IEBus), and/or media oriented systems transport (MOST) that is generally used for supporting in-vehicle multimedia electric equipment, such as an audio heat unit, an amplifier, a CD player, a DVD player, cellular connection, Bluetooth connection, peripheral computer connection, rear seat entertainment units, radio, digital storage, and/or a GPS navigation system;

(9) low-voltage differential signaling (LVDS) that is generally used for supporting head-up displays, instrument panel displays, other digital displays, and driver assist digital video cameras;

(10) FlexRay that may be used for safety-critical and/or by-wire applications; and

(11) Ethernet that is used for operative connection with a fault diagnostics system (on-board diagnostics, OBD), an infotainment system, and a drive assistance system (DAS) including a function such as surround view using a camera due to highly efficient use of available bandwidth through one-to-one communication connection with equipment.

In the above example, at least one vehicle gateway may be included in the vehicle network such that the ECUs or electronic parts using different bus communication protocols communicate with each other. For example, in a safety-related issue, a braking ECU, an engine control ECU, and/or a transmission control ECU may need to communicate with each other. At this time, the gateway may provide a protocol conversion function for easy communication between ECUs that support different communication protocols.

The vehicle gateway according to the embodiment may include a predetermined diagnostics communication interface module, and may communicate with an external diagnostics device through the diagnostics communication interface module. Here, the diagnostics communication interface module may provide at least one of an Ethernet communication function, a Bluetooth communication function, a Wi-Fi communication function, an NFC (near-field connection) communication function, a WCDMA (wideband code division multiple access) communication function, an LTE (long-term evolution) communication function, or an LTE-Advanced communication function.

Figure 4:
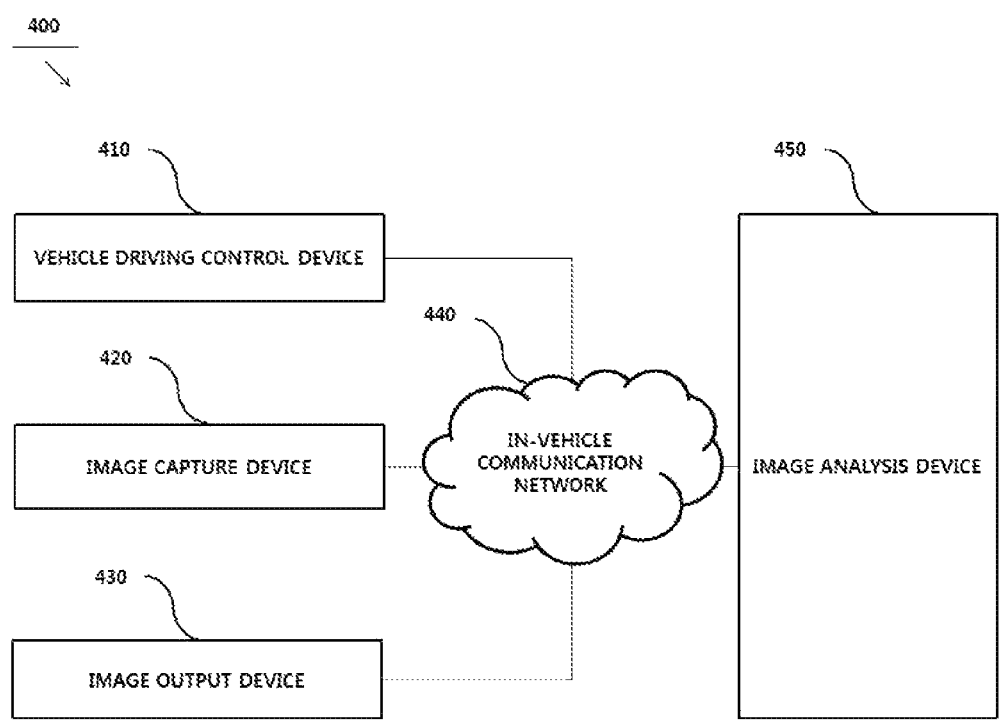
FIG. 4 is a block diagram illustrating an image analysis system according to an embodiment.

FIG. 4 is a block diagram illustrating an image analysis system according to an embodiment.

Referring to FIG. 4, the image analysis system 400 may include a vehicle driving control device 410, an image capture device 420, an image output device 430, an in-vehicle communication network 440, and an image analysis device 450.

The vehicle driving control device 410 may collect driving state information in real time while the vehicle is driven. Here, the driving state information may include at least one of driving speed information, steering angle information, brake manipulation state information, or cruise function setting state information.

The vehicle driving control device 410 may transmit the collected driving state information to the image analysis device 450 through the in-vehicle communication network 440 periodically or whenever a specific event occurs. In an example, the vehicle driving control device 410 may include an engine management ECU, a brake control ECU, a speed sensor, and a steering control ECU. However, the disclosure is not limited thereto. Any device capable of collecting information about the current driving state of the vehicle may be used. In an example, the vehicle driving control device 410 may also include a global positioning system (GPS) device and a navigation device.

The image capture device 420 may transmit image information acquired through an image sensor provided therein, e.g. a camera, to the image analysis device 450 through the in-vehicle communication network 440. A plurality of image sensors may be mounted in the vehicle to acquire image information at various angles and in various directions, and may transmit the image information to the image analysis device 450. At this time, the orientation angles and disposition directions of camera lenses of the image sensors (hereinafter, referred to as camera setting information or camera setting parameters for the convenience of description) may be set differently, and may be changed. In an example, the orientation angle of each camera lens may mean the orientation angle of each axis in a three-axis (x/y/z) coordinate plane. However, the disclosure is not limited thereto. In addition, the camera disposition information may be information for identifying the position at which a camera is disposed in the vehicle (which may include, for example, the front, the left surface, the right surface, and the rear).

The image output device 430 may output the image processed by the image analysis device 450 through the in-vehicle communication network 440. A display device included in an audio video navigation (AVN) system mounted in the vehicle may be used as the image output device 430. However, the disclosure is not limited thereto. A separate image output device may be disposed and mounted at a specific region in the vehicle.

The image analysis device 450 may identify a foreground motion pattern and a background image pattern through image analysis based on the vehicle driving state information and the image information.

The foreground motion may be the change of the foreground or the change of an object.

In addition, the image analysis device 450 may identify a moving object in front of the vehicle based on the identified foreground motion pattern, and may transmit the object identification result to the image output device 430 through the in-vehicle communication network 440. In another example, upon sensing a dangerous situation based on the object identification result, the image analysis device 450 may perform control such that a predetermined alarm is output through a speaker and/or an alarm lamp (not shown) provided at one side of the vehicle.

In addition, the image analysis device 450 may estimate the setting parameters of a camera based on the identified background motion pattern, and may compare the estimate camera setting parameters with actually set camera setting parameters to correct the setting parameters of the camera.

The orientation angle or direction of the camera mounted in the vehicle may be changed due to external physical impacts. In this case, the current camera setting information and the current orientation direction of the camera may differ from each other. For accurate image analysis, therefore, it may be important to correct the current camera setting information so as to correspond to the current orientation direction of the camera.

In another embodiment, in the case in which the current camera setting information and the current orientation direction of the camera differ from each other, the image analysis device may perform control such that the position at which the camera is disposed and the orientation direction of the camera are matched with the current camera setting information.

In an example, the camera 10 included in the image capture device 420 according to this embodiment may be a 3D stereo camera. However, the disclosure is not limited thereto.

The 3D stereo camera may generate a stereoscopic image through two cameras included therein. The 3D stereo camera may be classified depending on a camera disposition type and a fixation point type. The camera disposition type includes a parallel type and a perpendicular type. The distance from the eyes of a person to a target is called the fixation distance. In the same manner, the distance from the camera to a target when an image is captured using the stereo camera is also called the fixation distance. At this time, the camera disposition type may be classified into a horizontal type, a crossing type, and a horizontal moving type depending on how the fixation distance is calculated and controlled.

The parallel type camera has a simple structure, since two cameras are disposed side by side. However, it is difficult to reduce the distance between the cameras to less than 65 mm, which is the distance between the eyes of a typical person, compared to the size of the lens and the main body.

The perpendicular type camera has a structure in which two cameras are disposed so as to be perpendicular to each other, a beam splitter (or a half mirror) is disposed in front of the cameras, and left and right images transmitted and reflected through a lens are captured. In addition, the perpendicular type camera has advantages in that the two cameras may be disposed so as to be spaced apart from each other by a distance less than 65 mm and in that macro stereoscopic capture is possible. However, the structure of the perpendicular type camera is large, and it is difficult to elaborately manufacture the perpendicular type camera.

In the horizontal type camera, two cameras are disposed side by side, and the distance between the cameras is adjustable only in the horizontal direction. The horizontal type camera is of the simplest type, in which a fixation point control function is not provided, making it easy to manufacture the horizontal type camera. In a scene at a near distance or a scene requiring a high-power zoom, however, parallax is excessively generated, which causes eye fatigue.

The crossing type camera is of a type in which the camera is rotated in order to adjust the fixation distance as if the pupil of the eye of a person were rotated in order to adjust the fixation distance, and has a simple structure. However, the crossing type camera has problems in that the relationship between distance and parallax may be distorted and in that a keystone distortion phenomenon, in which an image is shown in a trapezoidal shape, rather than a rectangular shape, occurs, whereby fatigue may be caused.

In the horizontal moving type camera, two cameras are arranged parallel to each other in the same manner as in the horizontal type camera, and the distance between each camera and a lenses is increased in order to adjust the fixation point. This type has advantages in that the distortion in the relationship between distance and parallax, which occurs in the crossing type camera, is solved and in that it is possible to capture a relatively high-quality stereoscopic image. In the horizontal moving type camera, however, the lens and the camera main body must be manufactured separately.

The detailed construction and operation of the image analysis device 450 will become more apparent through the following description given with reference to FIGS. 5 to 14.

Figure 5:
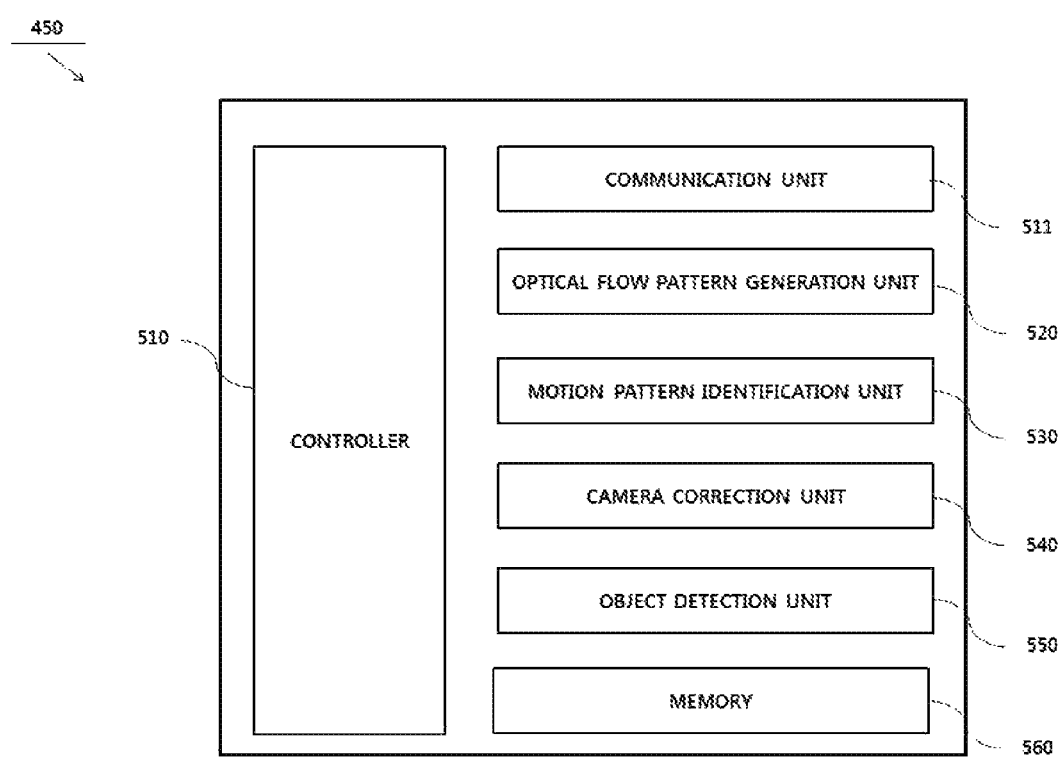
FIG. 5 is a block diagram illustrating the construction of an image analysis device according to an embodiment.

FIG. 5 is a block diagram illustrating the construction of an image analysis device according to an embodiment.

Referring to FIG. 5, the image analysis device 450 may include a controller 510, a communication unit 511, an optical flow pattern generation unit 520, a motion pattern identification unit 530, a camera correction unit 540, an object detection unit 550, and a memory 560.

It should be noted that the elements of the image analysis device 450 shown in FIG. 5 are not necessarily essential elements, and therefore the image analysis device may include a smaller number of elements or a larger number of elements.

The controller 510 may control the overall operation of the image analysis device 450, and may control input and output. In addition, the controller 510 may manage input and output data and the state of the lower modules (e.g. the communication unit 511, the optical flow pattern generation unit 520, the motion pattern identification unit 530, the camera correction unit 540, and the object detection unit 550).

The communication unit 511 may process a message (or a signal or a packet) transmitted and received through the in-vehicle communication network 440. The communication unit 511 may include a modulator for modulating a message or a packet and a demodulator for demodulating the received signal to generate a packet or a message. The modulator and the demodulator may be configured and mounted as hardware and/or software modules, as in the CAN driver of FIG. 2.

Upon receiving vehicle driving state information from the vehicle driving control device 410, the communication unit 511 may transmit the same to the controller 510.

In addition, upon receiving image information from the image capture device 420, the communication unit 511 may transmit the same to the controller 510.

The optical flow pattern generation unit 520 may receive the vehicle driving state information and the image information from the controller 510. The optical flow pattern generation unit 520 may generate information for assortment and determination of the vehicle driving state, the background, or the foreground. The information for determination may be an optical flow pattern, the amount of information that is moved, and the direction in which information is moved, or attribute values, such as speed, direction, and length, among determination criteria.

The optical flow pattern generation unit 520 may generate a first optical flow pattern, estimated based on the vehicle driving state information, and may generate a second optical flow pattern, calculated based on the image information.

The motion pattern identification unit 530 may compare the first optical flow pattern and the second optical flow pattern with each other to identify a foreground motion pattern and a background motion pattern. Here, "foreground motion" may be motion in which an optical flow vector does not have a uniform pattern over time while the vehicle is driven, such as a front vehicle or a pedestrian. That is, the foreground motion may mean the motion of an actually moving object. In contrast, "background motion" may be motion in which an optical flow vector has a uniform pattern over time while the vehicle is driven, such as a guardrail or the surface of a road. That is, the background motion may be the motion of an object that is stationary while the vehicle is driven.

The motion may be interpreted based on an output image. That is, although the background is stationary, it may be interpreted that the background is moving in an output image due to the relative motion caused as the result of the movement of the vehicle. The motion of an object may be interpreted based on an output image in the same manner as in the background motion.

The camera correction unit 540 may estimate setting parameters of the camera based on the identified background motion pattern, may compare the estimated parameters with actually set parameters, and may determine whether it is necessary to correct the setting parameters of the camera. Upon determining that it is necessary to correct the setting parameters of the camera, the camera correction unit 540 may calculate and generate setting information to be updated (hereinafter, referred to as "correction setting information" for the convenience of description). The controller 510 may transmit a predetermined control signal including the generated correction setting information to the image capture device 420 in order to correct the orientation angle and position of the camera.

The camera correction is very important to acquire an accurate view screen at the time of converting an image view. In an example, in the case in which the camera setting is not normal when a front-view screen is converted into a top-view screen, an incorrect or distorted top view image may be output.

The object detection unit 550 may identify a moving object based on the foreground image pattern. Information about the identified object may be mapped with an image captured by the camera, and may be transmitted to the image output device 430, which may output the identified object.

In addition, upon sensing a dangerous situation based on the object identification result, the object detection unit 550 may transmit the same to the controller 510, which may perform control such that a predetermined warning alarm is output. In an example, the warning alarm may be output through an alarm means, such as a speaker, a beeper, a vibrator, or an LED light. However, the disclosure is not limited thereto.

The current camera setting information may be recorded and maintained in the memory 560. In the case in which the camera setting information is normally corrected, the controller 510 may update the current camera setting information into the corrected camera setting information.

The detailed operation of the elements constituting the image analysis device 450 will become more apparent through the following description given with reference to the drawings.

Figure 6:
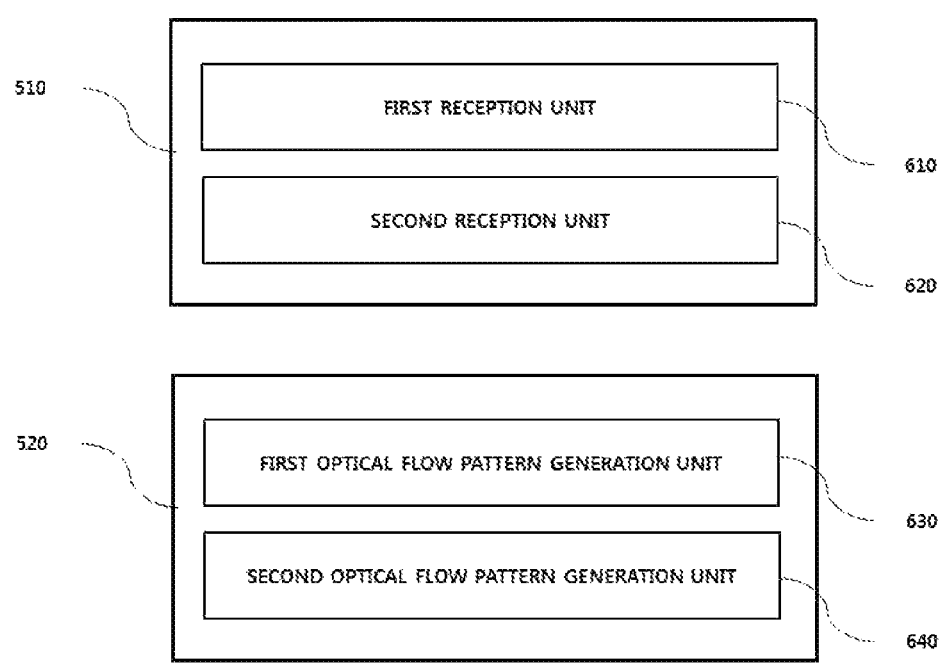
FIG. 6 is a view illustrating the detailed construction of the image analysis device according to the embodiment.

FIG. 6 is a view illustrating the detailed construction of the image analysis device according to the embodiment.

Referring to FIG. 6, the communication unit 511 may include a first reception unit 610 and a second reception unit 620.

Upon receiving vehicle driving state information from the vehicle driving control device 410, the first reception unit 610 may transmit the same to the controller 510.

Upon receiving image information or an image signal from the image capture device 420, the second reception unit 620 may decode the same, and may transmit the decoded information to the controller 510. In this case, the second reception unit 620 may extract an image frame from the received image information. In another example, the reception unit 620 may directly receive an image frame from the image capture device 420.

The optical flow pattern generation unit 520 may include a first optical flow pattern generation unit 630 and a second optical flow pattern generation unit 640.

The first optical flow pattern generation unit 630 may generate a first optical flow pattern estimated based on the vehicle driving state information. In an example, the first optical flow pattern generation unit 630 may estimate the direction of an optical flow vector based on the steering angle information, and may estimate the magnitude of the optical flow vector based on the vehicle speed information. Subsequently, the first optical flow pattern generation unit 630 may estimate the optical flow vector based on the estimated direction and magnitude, and may map the estimated optical flow vector in an image plane in order to generate a first optical flow pattern.

The second optical flow pattern generation unit 640 may generate a second optical flow pattern using the image information.

In an example, the second optical flow pattern generation unit 640 may acquire image frames from the image information, and may compare the acquired successive image frames with each other to calculate an optical flow vector. Subsequently, the second optical flow pattern generation unit may map the calculated optical flow vector in an image plane in order to generate a second optical flow pattern.

Figure 7:
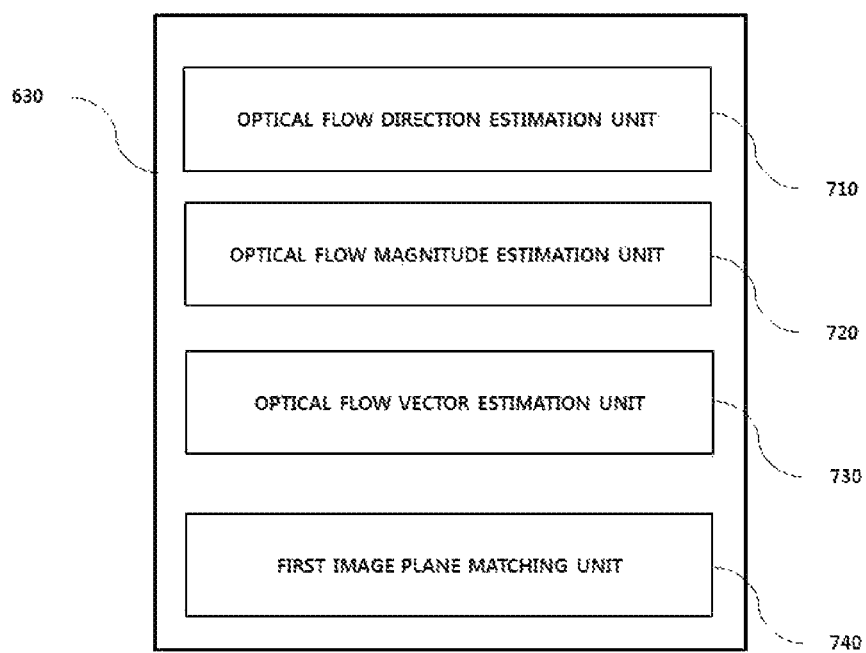
FIG. 7 is a view illustrating the detailed construction of a first optical flow pattern generation unit according to an embodiment.

FIG. 7 is a view illustrating the detailed construction of a first optical flow pattern generation unit according to an embodiment.

Referring to FIG. 7, the first optical flow pattern generation unit 630 may include an optical flow direction estimation unit 710, an optical flow magnitude estimation unit 720, an optical flow vector estimation unit 730, and a first image plane matching unit 740.

The optical flow direction estimation unit 710 may estimate the direction of an optical flow vector based on steering angle information. In another example, the optical flow direction estimation unit 710 may estimate the direction of the optical flow vector using GPS information as well as the steering angle information.

The optical flow magnitude estimation unit 720 may estimate the magnitude of the optical flow vector based on vehicle speed information.

The optical flow vector estimation unit 730 may generate an optical flow vector normalized based on the estimated direction and magnitude.

The first image plane matching unit 740 may match the normalized optical flow vector with an image plane to generate a first optical flow pattern. Here, the image plane may be a plane set based on the current setting information of the camera. That is, the image plane may be set by the position at which the camera is mounted in the vehicle and the orientation direction and angle of the camera.

Figure 8:
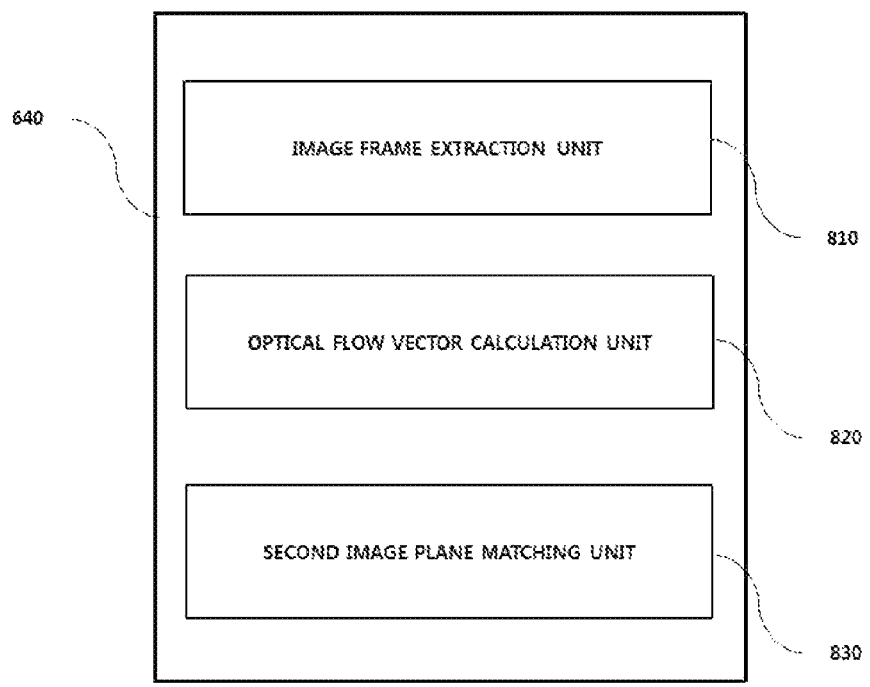
FIG. 8 is a block diagram illustrating the detailed construction of a second optical flow pattern generation unit according to an embodiment.

FIG. 8 is a block diagram illustrating the detailed construction of a second optical flow pattern generation unit according to an embodiment.

Referring to FIG. 8, the second optical flow pattern generation unit 640 may include an image frame extraction unit 810, an optical flow vector calculation unit 820, and a second image plane matching unit 830.

The image frame extraction unit 810 may extract successive image frames from image information.

The optical flow vector calculation unit 820 may calculate an optical flow vector based on a change in the optical flow between pixels or pixel groups of two successive image frames.

The second image plane matching unit 830 may match the calculated optical flow vector with an image plane to generate a second optical flow pattern.

Figure 9:
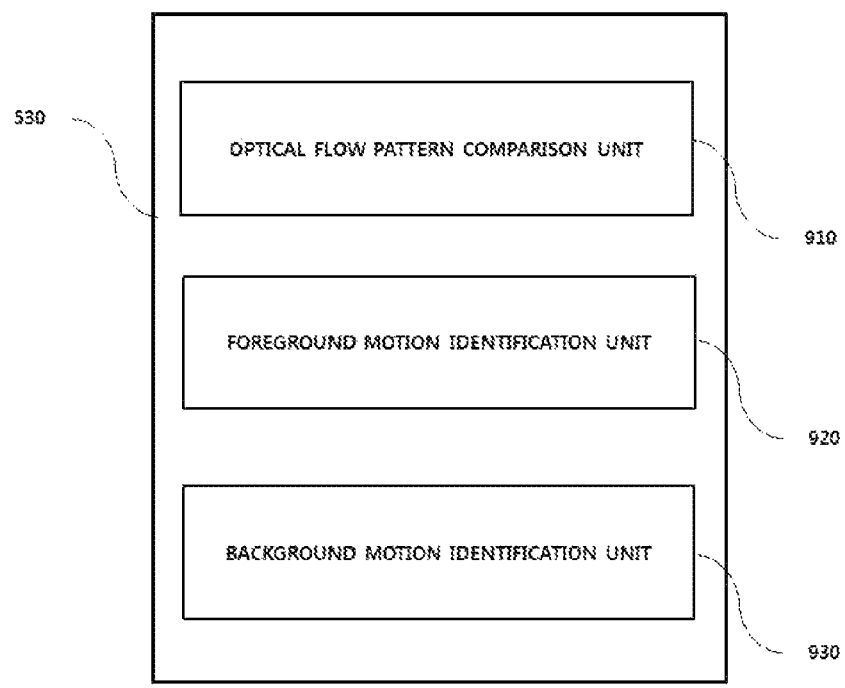
FIG. 9 is a block diagram illustrating the detailed construction of a motion pattern identification unit according to an embodiment.

FIG. 9 is a block diagram illustrating the detailed construction of a motion pattern identification unit according to an embodiment.

Referring to FIG. 9, the motion pattern identification unit 530 may include an optical flow pattern comparison unit 910, a foreground motion identification unit 920, and a background motion identification unit 930.

The optical flow pattern comparison unit 910 may compare the optical flow vectors of the first optical flow pattern and the second optical flow pattern with each other at corresponding positions thereof.

In the case in which the difference value between the optical flow vectors is found to be within a predetermined reference range as the result of the comparison, the optical flow pattern comparison unit 910 may sort or confirm the optical flow vectors as the optical flow vectors corresponding to the background motion.

On the other hand, in the case in which the difference value between the optical flow vectors deviates from the predetermined reference range as the result of the comparison, the optical flow pattern comparison unit 910 may sort or confirm the optical flow vectors as the optical flow vectors corresponding to the foreground motion.

The foreground motion identification unit 920 may generate a foreground motion pattern using the sorted optical flow vector corresponding to the foreground motion.

The background motion identification unit 930 may generate a background motion pattern using the sorted optical flow vector corresponding to the background motion.

Figure 10:
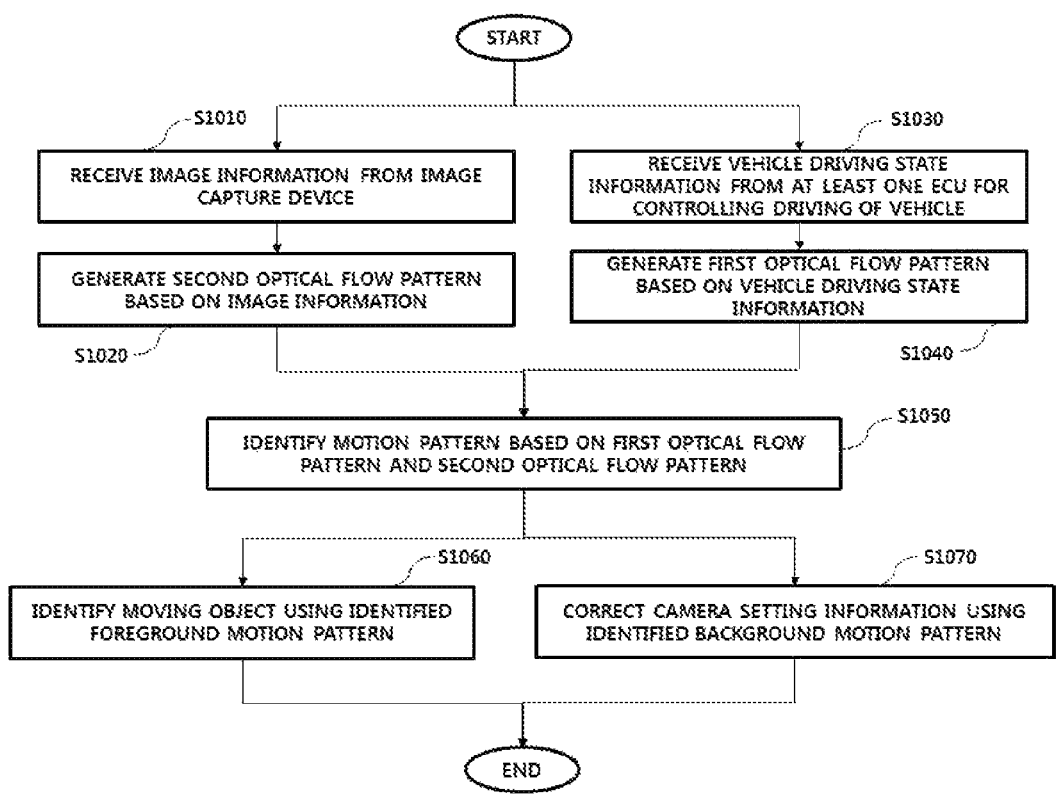
FIG. 10 is a flowchart illustrating an image analysis method using vehicle driving state information in the image analysis device according to the embodiment.

FIG. 10 is a flowchart illustrating an image analysis method using vehicle driving state information in the image analysis device according to the embodiment.

Referring to FIG. 10, the image analysis device may receive image information from the image capture device, and may generate a second optical flow pattern based on the received image information (S1010 and S1020).

Upon receiving vehicle driving state information from at least one ECU for controlling the driving of the vehicle, the image analysis device may generate a first optical flow pattern estimated based on the received vehicle driving state information (S1030 and S1040).

The image analysis device may identify a motion pattern based on the first optical flow pattern and the second optical flow pattern (S1050). Here, the motion pattern may include a foreground motion pattern and a background image pattern.

The image analysis device may identify a moving object using the identified foreground motion pattern (S1060).

In addition, the image analysis device may correct camera setting information using the identified background motion pattern (S1070).

Figure 11:
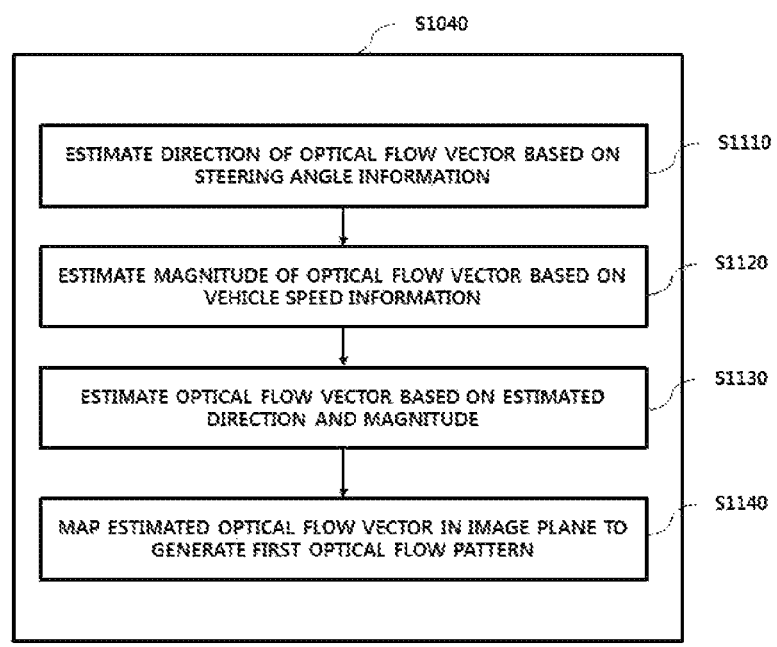
FIGS. 11 to 13 are flowcharts illustrating the detailed processes of the image analysis method according to the embodiment.
Figure 12:
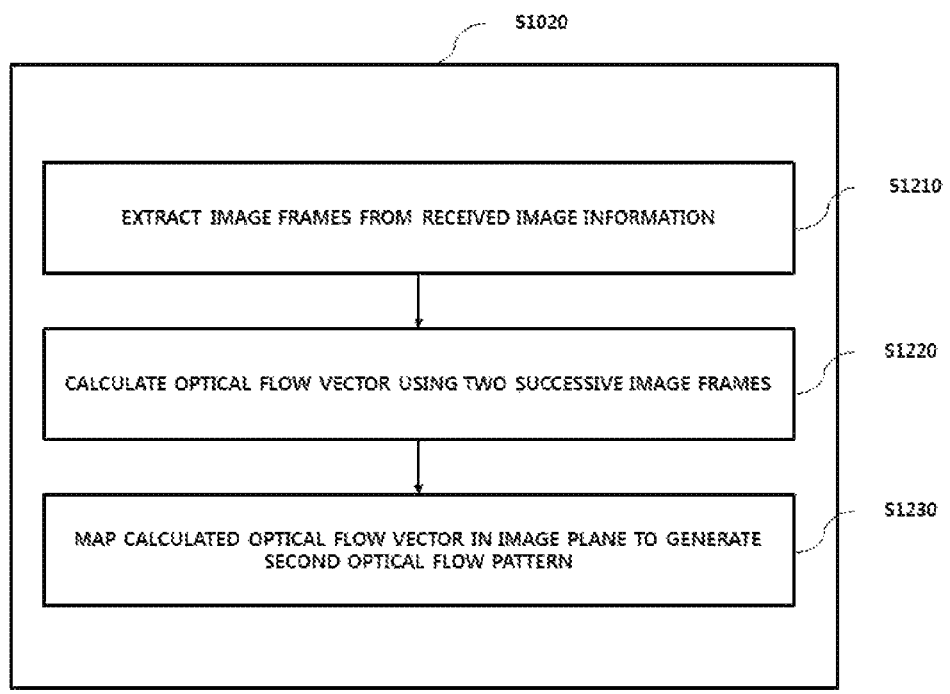
Figure 13:
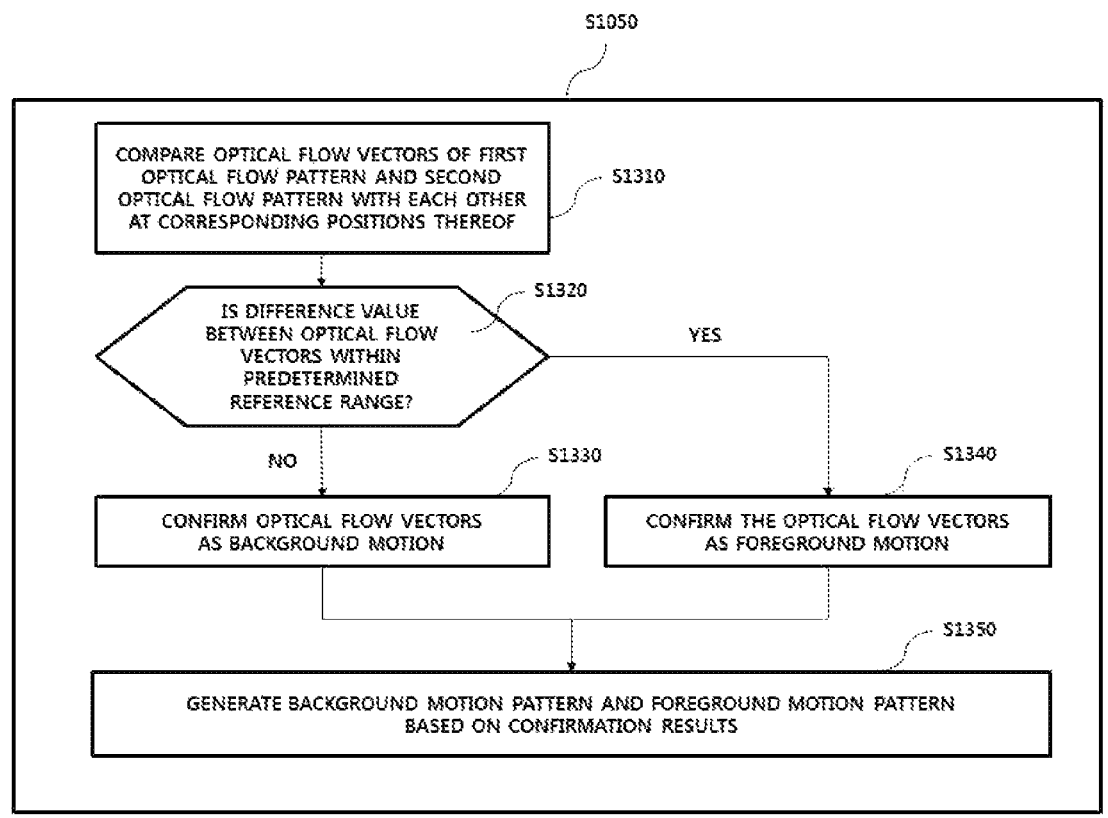

FIGS. 11 to 13 are flowcharts illustrating the detailed processes of the image analysis method according to the embodiment.

Referring to FIG. 11, step 1040 of FIG. 10 may be divided into the following four substeps.

The image analysis device may estimate the direction of an optical flow vector based on steering angle information included in the vehicle driving state information (S1110).

The image analysis device may estimate the magnitude of the optical flow vector based on vehicle speed information included in the vehicle driving state information (S1120). Of course, it should be noted that step 1110 and step 1120 may be performed sequentially or reversely.

The image analysis device may estimate the optical flow vector based on the estimated direction and magnitude (S1130). Here, the estimated optical flow vector has a normalized vector value including only a direction and magnitude, and thus may be different from the view plane actually captured by the camera.

The image analysis device may map the estimated optical flow vector in an image plane to generate a first optical flow pattern (S1140). Here, the image plane may be set based on the setting information of the camera.

Vehicle driving speed information may be collected by a sensor for sensing the speed of the vehicle while the vehicle is driven, and may be received by the image analysis device. A vehicle speed sensor may be a mechanical sensor or an electrical sensor. The former is used only for a speedometer, whereas the latter may be used for both a speedometer and an electronic device.

In an example, in the mechanical vehicle speed sensor, the rotation of an output shaft of a transmission is transmitted to a driving shaft of a speedometer via a flexible shaft to move an indicator of the speedometer. In the mechanical vehicle speed sensor, therefore, the motion of the indicator of the speedometer may be sensed to measure the current driving speed of vehicle. In the electronic vehicle speed sensor, on the other hand, the rotation of an output shaft of a transmission is detected using an electronic pickup, a Hall element, a reed switch, or a magnetic resistance element to measure the current driving speed of the vehicle.

The vehicle speed sensor detects a speed corresponding to the speed of wheels. In the case in which the wheels are locked or slip, therefore, the speed of the vehicle body and the value measured by the sensor may be different from each other. In order to more accurately measure the driving speed of the vehicle, therefore, the movement speed of the surface of a road may be measured using a laser or ultrasonic waves to estimate the actual driving speed of the vehicle.

Referring to FIG. 12, step 1020 of FIG. 10 may include the following three substeps.

The image analysis device may extract image frames from the received image information (S1210).

The image analysis device may calculate an optical flow vector using two successive image frames in time series (S1220).

The image analysis device may map the calculated optical flow vector in an image plane to generate a second optical flow pattern (S1230). Here, the image plane may be a plane set based on predetermined setting information (or setting parameters) of the camera, which is, however, merely an embodiment. In another example, the image plane may be set based on the image information received from the image capture device or using additional image information.

Referring to FIG. 13, step 1050 of FIG. 10 may include step 1310 to step 1350.

The image analysis device may compare the optical flow vectors of the first optical flow pattern and the second optical flow pattern with each other at corresponding positions thereof (S1310).

The image analysis device may determine whether the difference value between the optical flow vectors is within a predetermined reference range (S1320).

Upon determining that the difference value between the optical flow vectors is within the reference range, the image analysis device may confirm the optical flow vectors as a background motion (S1330).

On the other hand, upon determining that the difference value between the optical flow vectors deviates from the reference range, the image analysis device may confirm the optical flow vectors as a foreground motion (S1340).

The image analysis device may generate a background motion pattern and a foreground motion pattern based on the confirmation results of step 1330 and step 1340 (S1350).

At this time, the generated foreground motion pattern may be mapped with an image captured by the camera, and may then be output through the image output device, which is operatively connected to the image analysis device.

Figure 14:
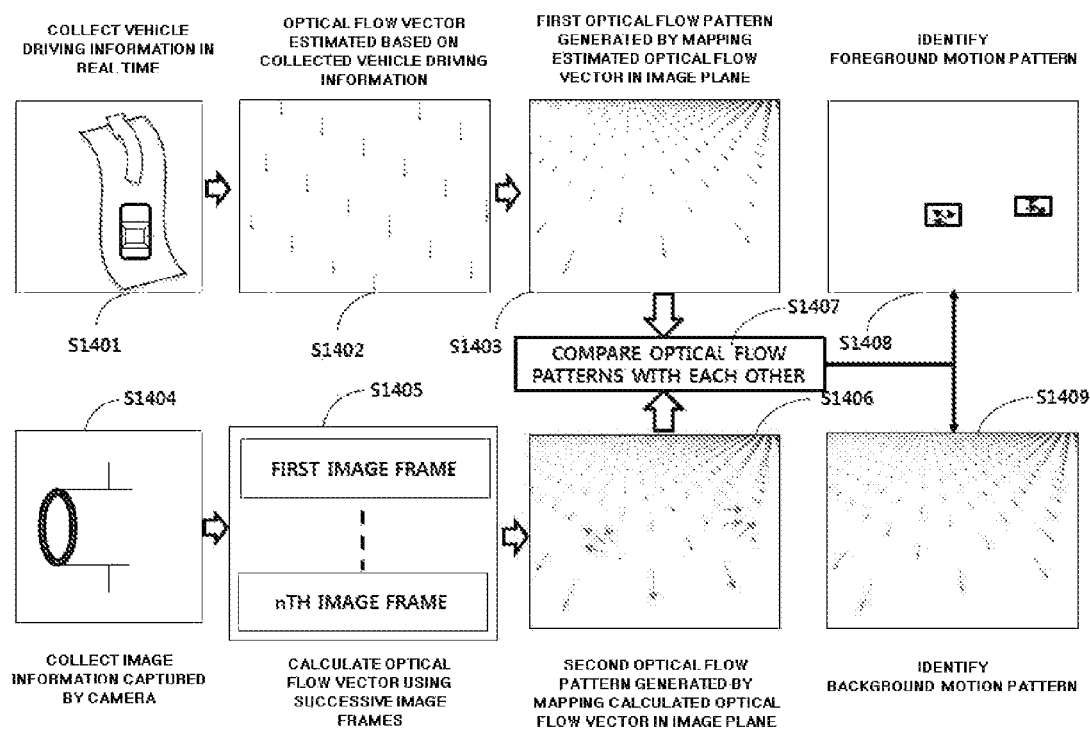
FIG. 14 is a view illustrating an image analysis process based on the vehicle driving state information in the image analysis system according to the embodiment.

FIG. 14 is a view illustrating an image analysis process based on the vehicle driving state information in the image analysis system according to the embodiment.

Referring to FIG. 14, vehicle driving information measured or collected by the vehicle controllers may be transmitted to the image analysis device through the in-vehicle communication network (S1401).

The image analysis device may estimate an optical flow vector based on the collected vehicle driving information, and may then map the estimated optical flow vector in an image plane to generate a first optical flow pattern (S1402 and S1403).

Meanwhile, the image information captured by the camera may be transmitted to the image analysis device through the in-vehicle communication network (S1404).

The image analysis device may extract image frames from the received image information, and may calculate an optical flow vector using two successive image frames (S1405). The image analysis device may map the calculated optical flow vector in an image plane to generate a second optical flow pattern (S1406).

Step 1401 to step 1403 and step 1404 to step 1406 may be performed in the state of being temporally synchronized with each other.

The image analysis device may compare the first optical flow pattern and the second optical flow pattern with each other to identify a motion pattern (S1407). At this time, the image analysis device may identify a foreground motion pattern and a background motion pattern based on the comparison result (S1408 and S1409).

Figure 15:
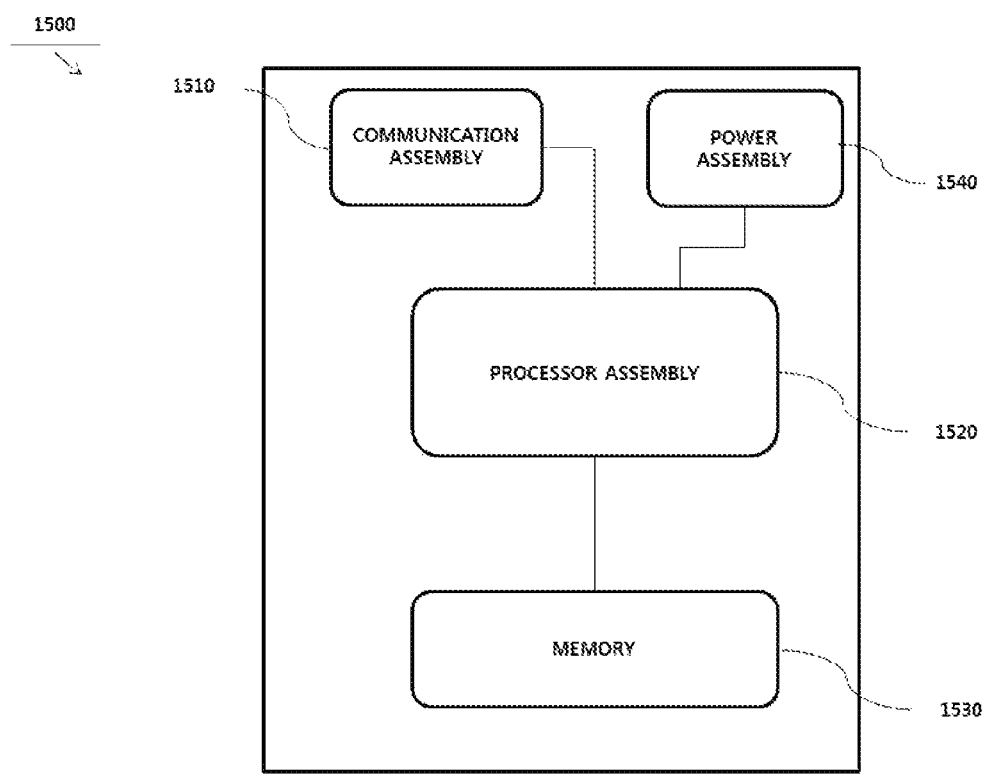
FIG. 15 is a block diagram illustrating the construction of an image analysis device according to another embodiment.

FIG. 15 is a block diagram illustrating the construction of an image analysis device according to another embodiment.

Referring to FIG. 15, the image analysis device 1500 may include a communication assembly 1510, a processor assembly 1520, a memory 1530, and a power assembly 1540.

The power assembly 1540 may manage electric power necessary to operate the device, and the communication assembly 1510 may provide a communication interface with another controller via the in-vehicle communication network. In an example, the communication assembly 1510 may include a digital signal processor (DSP) and an application specific integrated circuit (ASIC).

The processor assembly 1520 may have an application program for controlling the overall operation of the device installed therein, and may include at least one microprocessor. Application software and firmware necessary to operate the processor assembly 1520 are stored in the memory 1530, and may be loaded in a processor and then executed when power is supplied to the device.

In addition, the image analysis device 1500 may be operated based on an operating system (OS) stored in the memory 1530. Examples of the operating system stored in the memory 1530 of the image analysis device 1500 may include Windows Server™, Mac OS X™, Unix™, Linux™, and FreeBSD™. However, the disclosure is not limited thereto.

An instruction, i.e. a program, executed by the processor assembly 1520, such as an application program, may be stored in the memory 1530. The application program stored in the memory 1530 may include one or more modules. At this time, each module corresponds to a series of instruction groups. In addition, the processor assembly 1520 may be configured to execute an instruction, and may perform the methods shown in FIGS. 10 to 13.

In an example, the processor assembly 1520 may receive image information from the image capture device through the communication assembly 1510, and may generate a second optical flow pattern based on the received image information.

In addition, the processor assembly 1520 may receive vehicle driving state information from at least one ECU for controlling the driving of the vehicle through the communication assembly 1510, and may generate a first optical flow pattern estimated based on the received vehicle driving state information.

The processor assembly 1520 may identify a motion pattern based on the first optical flow pattern and the second optical flow pattern. Here, the motion pattern may include a foreground motion pattern and a background image pattern.

The processor assembly 1520 may identify a moving object using the identified foreground motion pattern, and may correct camera setting information using the identified background motion pattern.

It will be apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes falling within the meaning and equivalency range of the appended claims are intended to be embraced therein.

INDUSTRIAL APPLICABILITY

Embodiments relate to image analysis, and more particularly may be applied to an image analysis device that is capable of analyzing a motion pattern using an optical flow pattern estimated based on vehicle driving information while a vehicle is driven and an optical flow pattern calculated based on image information captured by a camera.

The invention claimed is:

1. An image analysis method in a device operatively connected to a camera and a controller through an in-vehicle communication network, the image analysis method comprising:
   receiving vehicle driving information from a controller for controlling driving of a vehicle;
   receiving image information captured by the camera;
   generating a first optical flow pattern estimated based on the vehicle driving information;
   generating a second optical flow pattern calculated based on the image information; and
   identifying a motion pattern based on the first optical flow pattern and the second optical flow pattern, the motion pattern including a foreground motion pattern and a background motion pattern;
   identifying a moving object based on the foreground motion pattern included in the motion pattern; and
   correcting camera setting parameters of the camera based on the background motion pattern by adjusting at least one of an orientation angle of the camera and a direction of the camera,
   wherein the motion pattern is identified based on a difference value between optical flow vectors of the first optical flow pattern and the second optical flow pattern at corresponding positions thereof, and
   wherein the optical flow vectors are confirmed as the background motion pattern when the difference value is within a predetermined reference range.

2. The image analysis method according to claim 1, wherein
   the vehicle driving information comprises steering angle information and vehicle speed information, and
   the step of generating the first optical flow pattern comprises:
   estimating a direction of an optical flow vector based on the steering angle information;
   estimating a magnitude of the optical flow vector based on the vehicle speed information;
   estimating the optical flow vector based on the estimated direction and magnitude; and
   generating the first optical flow pattern according to the estimated optical flow vector.

3. The image analysis method according to claim 1, wherein the step of generating the second optical flow pattern comprises:
  extracting image frames from the image information;
  calculating an optical flow vector using two successive ones of the image frames; and
  generating the second optical flow pattern according to the calculated optical flow vector.

4. The image analysis method according to claim 1, wherein, in a case in which the difference value deviates from the predetermined reference range, the optical flow vectors are confirmed as an object change pattern.

5. The image analysis method according to claim 4, wherein the background motion pattern and the object change pattern are generated based on the confirmation results.

6. The image analysis method according to claim 5, wherein the moving object is identified based on the object change pattern.

7. An image analysis device comprising:
  a communication unit for transmitting and receiving vehicle driving information and image information;
  a camera correction unit for correcting setting parameters of a camera;
  an optical flow pattern generation unit for generating a first optical flow pattern estimated based on the vehicle driving information and a second optical flow pattern calculated based on the image information;
  a motion pattern identification unit for identifying a motion pattern based on the first optical flow pattern and the second optical flow pattern, the motion pattern including a foreground motion pattern and a background motion pattern; and
  an object detection unit for identifying a moving object based on the foreground motion pattern included in the motion pattern,
  wherein the motion pattern is identified based on a difference value between optical flow vectors of the first optical flow pattern and the second optical flow pattern at corresponding positions thereof,
  wherein the motion pattern identification unit confirms the optical flow vectors as the background motion pattern when the difference value is within a predetermined reference range, and
  wherein the setting parameters of the camera are corrected based on the background motion pattern by adjusting at least one of an orientation angle of the camera and a direction of the camera.

8. The image analysis device according to claim 7, wherein
the vehicle driving information comprises steering angle information and vehicle speed information, and
the optical flow pattern generation unit comprises:
  a first optical flow pattern generation unit for generating the first optical flow pattern based on a direction of an optical flow vector estimated based on the steering angle information and a magnitude of the optical flow vector estimated based on the vehicle speed information; and
  a second optical flow pattern generation unit for extracting image frames from the image information, calculating an optical flow vector using two successive ones of the image frames, and generating the second optical flow pattern according to the calculated optical flow vector.

9. The image analysis device according to claim 8, wherein in a case in which the difference value deviates from the predetermined reference range, the motion pattern identification unit confirms the optical flow vectors as an object change pattern.

10. The image analysis device according to claim 9, wherein the moving object is detected based on the confirmed object change pattern.

11. An image analysis system comprising:
  an image capture device for collecting image information of a vehicle that is being driven using at least one image sensor, provided in the image analysis system;
  an image capture device correction unit for correcting setting parameters of the image capture device;
  a communication unit for receiving vehicle driving information and the image information through an in-vehicle communication network; and
  an image analysis device for generating a first optical flow pattern estimated based on the vehicle driving information and a second optical flow pattern calculated based on the image information and identifying a motion pattern based on the first optical flow pattern and the second optical flow pattern, and identifying a moving object,
  wherein the motion pattern comprises a background motion pattern and a foreground motion pattern,
  wherein the moving object is identified based on the foreground pattern included in the motion pattern, and
  wherein the setting parameters of the image capture device are corrected based on the background motion pattern by adjusting at least one of an orientation angle of the camera and a direction of the camera.

* * * * *